Nov. 15, 1932.  H. A. BOND  1,888,066
TEMPERATURE CONTROL OF EXOTHERMIC REACTIONS
Filed April 2, 1930
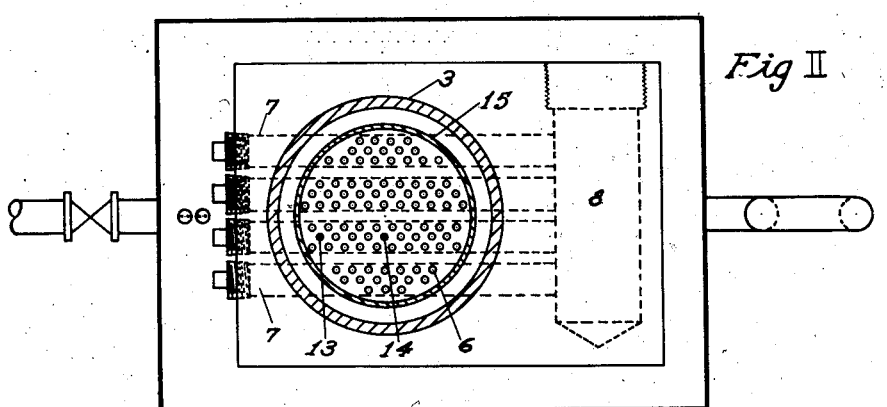
*Fig* II
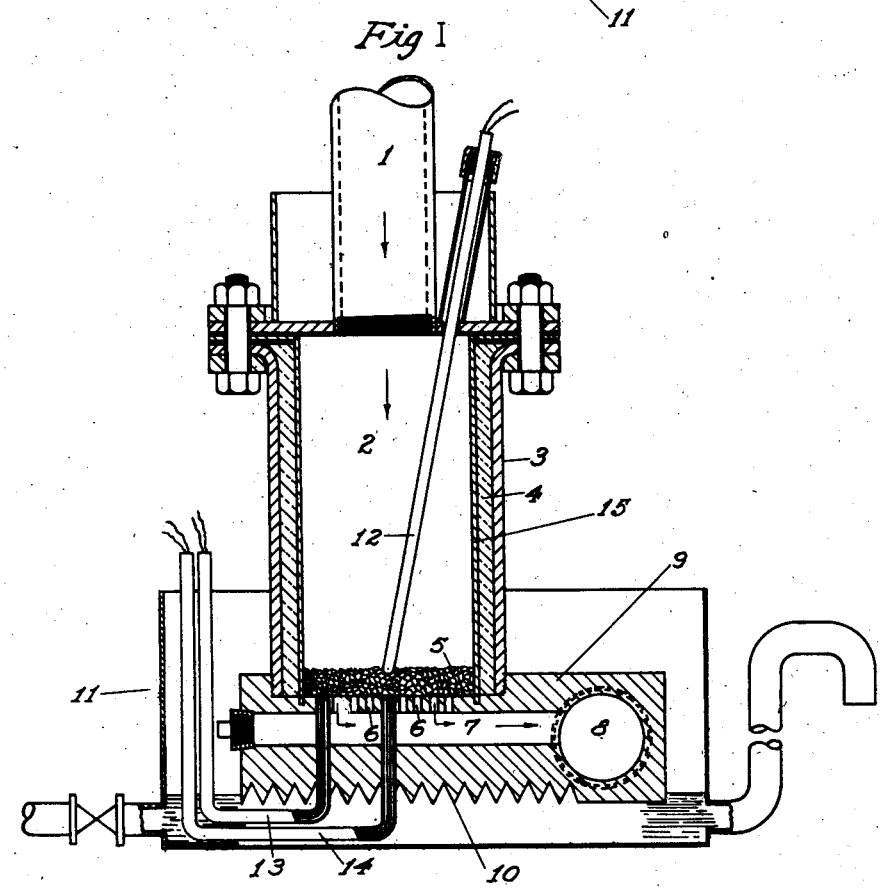
*Fig* I
INVENTOR.
Harlan A. Bond,
BY
ATTORNEYS.

Patented Nov. 15, 1932

1,888,066

UNITED STATES PATENT OFFICE

HARLAN A. BOND, OF METUCHEN, NEW JERSEY, ASSIGNOR, BY MESNE ASSIGNMENTS, TO THE ROESSLER & HASSLACHER CHEMICAL COMPANY, OF NEW YORK, N. Y., A CORPORATION OF DELAWARE

TEMPERATURE CONTROL OF EXOTHERMIC REACTIONS

Application filed April 2, 1930. Serial No. 441,013.

This invention relates to an apparatus and method for controlling the temperature in exothermic catalytic reactions where the heat is largely removed through conduction from the catalyst body to a suitable catalyst support and thence removed by a cooling means.

The method and apparatus will be herein described with reference to the oxidation of methanol to formaldehyde but the invention is of general scope and may be ordinarily applied to gas phase exothermic reactions conducted in the presence of solid, porous, heat conducting catalyst bodies. Such reactions occur in the oxidation of organic compounds and frequently in other types of reactions. If the temperature is not properly regulated side reactions occur, the products decompose and/or the initial materials pass through the reaction zone unreacted.

The invention will now be more particularly described in reference to the oxidation of methanol vapor by air in contact with such catalysts as silver.

Theoretically, the reaction should proceed according to the following equation:—

$$CH_3OH + 2\tfrac{1}{2} \text{ volumes air } (\tfrac{1}{2}O_2 + 2N_2) \rightarrow CH_2O + H_2O + 2N_2$$

This reaction is highly exothermic. Temperature regulation is essential for several reasons. If the temperature is too high, the catalyst body may be fused or sintered or be otherwise injured so that it no longer functions properly. High temperatures also promote the decomposition of the formaldehyde which results in undesirable by-products such as carbon monoxide and hydrogen or may even cause deposition of carbon on the catalyst. On the other hand, the reaction proceeds slowly, if at all, at very low temperature, under which conditions, the reaction is not self-sustaining and requires the application of external heat, or the reaction ceases to give maximum yields because a considerable portion of the methanol is not oxidized and appears in the final product.

An object of the present invention is to facilitate the control of temperature in the oxidation of methanol to formaldehyde and similar exothermic reactions and thereby increase yields.

It has been found that the specific reaction above proceeds favorably with catalysts such as silver in various forms between temperatures of about 400 to 850° C., and preferably the reaction temperature is maintained around 500 to 750° C.

Although the reaction is highly exothermic, it does not begin at low temperatures although at higher temperatures the exothermic heat makes it self-sustaining. It is therefore necessary to start the reaction by applying heat to the reactants. This may be done in any convenient fashion either by directly heating the reaction chamber from the outside, or by preheating the catalyst by passing hot gases through the reaction chamber until the necessary starting temperature has been reached. After the reaction begins, it, if properly controlled, should be self-sustaining and it will under these conditions develop more heat than is desirable. The problem then becomes one of heat removal.

Prior methods of heat removal have utilized the method of abstracting heat through the walls of the reaction chamber at right angles to the direction of the flow of the gaseous reactants. Such a method of heat extraction is unsatisfactory, because large temperature gradients prevail over the cross section of the catalyst body perpendicular to the gas flow. For example, it has been found that whereas the temperature of the reaction zone near the walls of the reaction chamber in such a system may be around 300°, the temperature within or near the center of the reaction zone, which is remote from the point of heat extraction, may be 700° or 800° or even higher. This leads to very inefficient conditions because the reactants passing through the cool catalyst near the periphery of the reaction zone will not be converted to formaldehyde, whereas those near the center are overheated and decomposition results. The yields, therefore, suffer both because methanol is found in the final product and because a portion of the formaldehyde which has been formed is decomposed. This condition also causes sintering of the catalyst in the hot zone, which results in non-uniform distribution of reacting gas through the catalyst mass due to a change in the resistance to the flow. Moreover, the sintered catalyst, because of its decreased surface, is, even if penetrable, comparatively inactive.

It has now been found that the temperature may be regulated uniformly and at will by removing the heat of reaction, by a means which provides for a uniform extraction of heat both from the entire cross section of the hot reaction zone and from the hot reactants.

The essential features of this apparatus and process consists in maintaining planes of substantially the same temperature in the reaction zone perpendicular to the gas flow and gradually and uniformly decreasing the temperature from plane to plane in the direction of gas flow. This is accomplished by providing a system such that all points in any given plane of cross section through the zone of heat production, perpendicular to the direction of gas flow, are equidistant from and in excellent thermal connection with a cooled surface of uniform temperature through which the heat is conducted away. In other words, the straight line paths of thermal flow, from all points on any plane in the heat producing zone, to the cooling medium are equal in length and thermal conductivity. Preferably the entire path of heat outflow extends through a material of excellent thermal conducting properties.

The catalyst, where the essential heat development occurs, should therefore, be in good thermal contact with the surface where heat is extracted. This method of heat control is, of course, applicable to any thermally conducting catalyst, and is of particular value if the catalyst mass has a high thermal conductivity. It has been found that this can be satisfactorily accomplished, for example, when employing a catalyst of high thermal conductivity such as electrolytic silver crystals, obtained by electrical deposition from acid solutions. These crystal masses are reduced to a size about 4 to 20 mesh and loosely packed in the reaction chamber. There they are supported on a metal surface through which heat is abstracted. As examples of other satisfactory catalyst material the following may be mentioned; porous silver obtained by pilling and reducing silver oxide or other silver compounds and other commonly noted forms of porous silver.

Referring to the accompanying drawing:

Fig. 1 is a vertical section of an apparatus suitable for carrying out the process of the invention.

Fig. 2 is a plan view, partially in section of the apparatus shown in Fig. 1.

The apparatus consists of a copper reaction chamber 2, having thermal insulation 4 between its double side walls 3 and 15 and a copper base plate 9. The heat conductive base plate forms the exit end of the reaction chamber and the catalyst 5 rests in thermal contact therewith. This base is perforated with a series of holes 6 through which the reaction products are led into the conduits 7 and thence to a header 8 from which they are taken for further treatment. If the holes drilled in the base are large in diameter as compared with the catalyst particles a metallic wire screen such as silver wire gauge of suitable mesh may be placed between the catalyst and the base. Numerous small holes in the base will serve as well.

This base plate is then immersed to any desired depth in a cooling medium, such as water, contained in the tank 11; the amount of heat removed by the cooling medium will depend upon the depth to which the base is submerged, as well as upon the temperature of the cooling medium. The bottom of this base plate is preferably cut into ridges and grooves 10, leaving an increased surface exposed to facilitate controlled heat transfer to the cooling medium.

The double walls 15 and 3, of the reaction chamber enclose an insulating material 4 so that essentially all the heat removal takes place through the base plate except for that removed as sensible heat of the exit gases.

The cooling may be effected by any suitable means, for example, by immersing the base plate in cooled running water or by permitting the water to boil, in which case the latent heat of vaporization will provide efficient cooling.

Utilization of this invention will further be described by an example with reference to the appended drawing.

Referring to Figure 1, a mixture of methanol and air having a ratio of 1:2, is fed through the lead-in pipe 1 into the reaction chamber 2 and passed downward through the catalyst body 5 composed of electrolytic silver crystals to a depth of about ¾ inch. The gas rate through the catalyst was at a space velocity of 50,000 per hour (N. T. P.). The gases here react with evolution of heat and the production of formaldehyde.

A thermocouple 12 was placed in the top of the catalyst mass and two other thermocouples 13 and 14 located in the base at its point of contact with the catalyst, one near the center and one near the edge. The temperature at the top of the catalyst ranged from 595 to 605° C., during the run, whereas the theoretical temperature developed by this reaction without cooling would be about 1000° C. The temperature at the base of the catalyst body was maintained at 250 to 260° C., by regulating the depth of immersion of the base in water.

The apparatus of my invention has been described as consisting of copper. It will be understood, however, that other materials are suitable for the construction of such an apparatus. Fundamentally, any material possessing a good thermal conductivity, the necessary strength, resistance to the corrosive action of the reaction products and which does not catalyze the reaction in an undesirable fashion can be used.

It will further be noted that by suitably regulating the temperature of the catalyst support on the one hand and the thickness of the catalyst bed on the other hand both the temperature of the hottest plane in the catalyst and the average temperature throughout the catalyst may be varied as desired.

A wide variation in the type of apparatus, size of reaction chamber and process with which said apparatus is employed is also possible. For example, the direction of gas flow might be reversed. The major portion of heat would then be removed at the entrance of the reaction chamber. The top as well as the bottom of the chamber might contact with the catalyst and heat be removed from both ends. So long as the walls are insulated a zone of uniform temperature perpendicular to the gas flow will be maintained and the method of heat removal is fundamentally the same. The catalyst employed will vary from process to process. They are generally suitable to this process if porous to the gas flow and possessing thermal conducting properties. It will therefore be understood that the invention is not to be limited to the particular apparatus and process described, but that all processes and apparatus wherein temperature is controlled in the manner herein described come within the scope of this invention.

I claim:

1. A method of regulating the temperature of exothermic gas phase reactions wherein the gases to be reacted are passed through a permeable heat conducting catalyst body, which comprises removing heat from the reaction zone along straight line paths of thermal flow in the direction of the gas flow within the catalyst chamber while preventing removal of heat from such chamber in a direction transverse to the gas flow.

2. A method of regulating the temperature of exothermic gas phase reactions wherein the gases to be reacted are passed through a permeable heat conducting catalyst body, which comprises removing heat uniformly through and from planes perpendicular to the gas flow in the reaction zone by uniformly cooling the exit end of said catalyst body throughout its whole extent while preventing removal of heat from the reaction zone in a direction transverse to the gas flow.

Signed at Perth Amboy in the county of Middlesex and State of New Jersey this 31st day of March, A. D. 1930.

HARLAN A. BOND.